(12) United States Patent
Raisch et al.

(10) Patent No.: US 6,364,407 B1
(45) Date of Patent: Apr. 2, 2002

(54) SEALING ELEMENT FOR A VEHICLE ROOF WITH A ROOF OPENING

(75) Inventors: Dieter Raisch, Rutesheim; Dirk Arnold, Freudenstadt; Wolfram Salz, Vaihingen/Enz, all of (DE)

(73) Assignee: CTS Fahrzeug Dachsysteme GmbH, Korntal-Münchlingen (DE)

( * ) Notice: Subject to any disclaimer, the term of this patent is extended or adjusted under 35 U.S.C. 154(b) by 0 days.

(21) Appl. No.: 09/676,978

(22) Filed: Oct. 2, 2000

(30) Foreign Application Priority Data

Sep. 30, 1999 (DE) .......................................... 199 46 925

(51) Int. Cl.[7] ................................................ B60J 10/12
(52) U.S. Cl. ............................ 296/216.06; 296/216.08; 296/220.01; 49/495.1
(58) Field of Search ........................ 296/216.06–216.09, 296/220.01, 219; 49/495.1

(56) References Cited

U.S. PATENT DOCUMENTS

| 1,893,350 | A | * | 1/1933 | Austin | .......................... 296/219 |
| 3,461,517 | A | * | 8/1969 | Eisenhard | .............. 49/495.1 X |
| 5,528,863 | A | * | 6/1996 | Scott | ..................... 49/495.1 X |
| 5,950,366 | A | * | 9/1999 | Uhlmeyer | .......... 296/216.07 X |

FOREIGN PATENT DOCUMENTS

| DE | 35 459 73 | | 8/1986 | |
| DE | 4000438 | * | 9/1990 | .................. 296/219 |
| DE | 196 34 325 | | 2/1996 | |
| GB | 2106971 | * | 4/1983 | ............. 296/216.07 |

* cited by examiner

Primary Examiner—Dennis H. Pedder
(74) Attorney, Agent, or Firm—Crowell & Moring LLP

(57) ABSTRACT

A sealing element for a vehicle roof with a roof opening in which a movable roof element is arranged so as to be adjustable between open and closed position has a sealing surface which in closed position of the roof element engages with an edge of the roof element to form a seal. In order to improve the seal in a simple manner, the sealing element is provided with a sealing arm which rests on a support. The upper side of the sealing arm forms the sealing surface.

10 Claims, 2 Drawing Sheets

SEALING ELEMENT FOR A VEHICLE ROOF WITH A ROOF OPENING

BACKGROUND OF THE INVENTION

This application claims the priority of German Application 199 46 925.3, filed Sep. 30, 1999, the disclosures of which are expressly incorporated by reference herein.

The present invention relates to a sealing element for a vehicle roof with a roof opening, and more particularly, to a sealing element in which a movable roof element is arranged so as to be adjustable between open position and closed position, whereby the sealing element in closed position of the roof element is situated with a sealing surface facing toward the upper side of the roof engaged with an edge of the roof element so as to form a seal.

DE 196 34 325 A1 describes a vehicle roof with a series of sliding panels for selective closing and opening of a roof opening.

The panels move along channels such that when the panels are moved in the longitudinal direction of the vehicle, the relatively flat composite of panels makes a translational movement. In the closed position, each panel engages sealing elements which are held on a roof frame at both sides of the roof opening.

The known sealing elements are intended to ensure waterproof and windproof closure against the roof frame in the closed position of the panels in that a lateral edge of the panel presses against an upper sealing surface which faces toward the upper side of the roof. The sealing surface of the sealing element, which is configured as a hollow chamber profile is inclined diagonally in the direction of the vehicle cabin so that the lateral edge of the panel must be pressed with a strong sealing force against the sealing surface in order to ensure a tight closure between panels and roof surface.

As a result of the sealing force, the sealing surface is deformed concavely causing a dent to be formed in the direction of the hollow chamber of the profile where water can collect and can be conducted through diffusion forces into the interior of the vehicle. In addition, the water can run off in the direction of the interior during a movement of the panels in the closed or open direction.

In addition, as a result of the high sealing force and the associated deformation of the hollow chamber profile, there is a danger that material fatigue and increased wear can occur at the sealing element with a resultant impairment of the sealing function. As a result of the connection of the interior space of the hollow chamber with the atmosphere, cracks in the wall of the hollow chamber can change the elastic behavior of the sealing element in undesirable ways.

SUMMARY OF THE INVENTION

An object of the present invention is to overcome the problem of configuring a sealing element in a simple manner with a high degree of sealing.

This problem has been solved according to the present invention by providing that the sealing element has a sealing arm projecting transversely, the upper side of which forms the sealing surface, with the sealing arm resting on a support.

According to the invention, the sealing element has a sealing arm which extends transversely and which rests on a support in the vehicle roof on the vehicle side. The sealing element is not configured as a hollow chamber profile, but rather the sealing function with respect to the sliding roof element is achieved through the lateral sealing arm which, on the one hand, ensures a flexible accommodation to the bordering side edge of the sliding roof element through its elasticity and can also compensate for greater tolerances of the roof element and, on the other hand, has sufficient opposition as a result of the support for developing adequately great sealing force. As a result of the absence of the hollow chamber profile, at least relatively minor damage of the sealing element does not have any significant influence on the sealing behavior because the elastic behavior of the sealing element is retained; the resistance of the sealing element to wear is increased.

The elastic behavior and the sealing behavior can be influenced through the geometry of the sealing arm of the sealing element. Depending on the length, cross-sectional geometry and angle of the body in relation to the sealing element, the sealing function can be adjusted. In an advantageous embodiment, the sealing body and the sealing arm in unloaded condition are configured approximately equal in length and are situated approximately at a 90° angle to each other. The sealing arm of relatively long configuration ensures a softly elastic behavior during closing of the vehicle roof.

The support in the vehicle roof which supports the free end of the sealing arm is preferably configured so as to be vertically adjustable as a result of which a fine adjustment for influencing the sealing behavior can be carried out after installation of the sealing element into the vehicle roof. This fine adjustment helps compensate for tolerances in the vehicle roof and in the sealing element as well as imprecision in the assembly of the roof or insertion of the sealing element and facilitates the setting of a uniform sealing pressure. The fixing of the support in the desired adjusted height can take place by form-fitting manner, by friction, or by continuity of material or by means of a fastening element.

The roof module comprising sealing element, roof frame, and movable roof element can be checked for seal prior to installation in the vehicle.

The support advantageously has a bearing shoulder on which the free end of the sealing arm can be rested with improved support. The free end of the sealing arm is advantageously provided with a sealing band which engages in the bearing shoulder of the support, with the sealing band in particular being configured as one part with the sealing element.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWING

Figure 1:
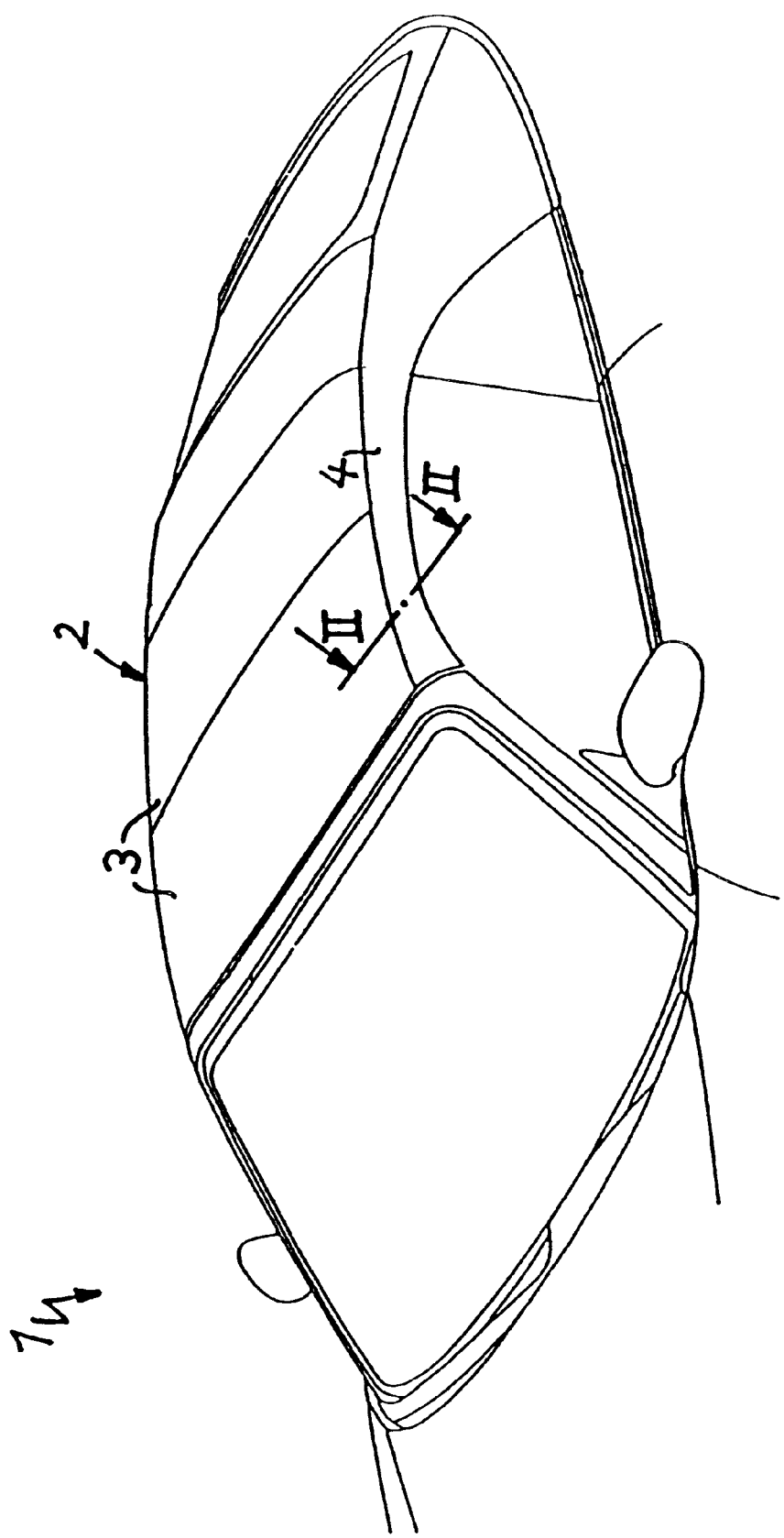
FIG. 1 is a perspective view of a vehicle roof with several roof elements in a roof opening which can be moved between closed and open position.

The vehicle roof 2 of a vehicle 1 depicted in FIG. 1 has a plurality of roof elements 3 which can be moved between closed position and open position in a roof opening of the vehicle roof. The roof elements can be a part of a hardtop vehicle roof, a multipanel sunroof, or a convertible top. The roof can also be a sunroof, however, with only one roof element.

The roof opening of the vehicle roof is bordered by a roof frame 4 in which one or more sealing elements are received for a watertight and windtight closure between the roof frame and the sealing elements in closed position. Sealing elements are also arranged in the frame of the windshield or a frame in the rear.

Figure 2:
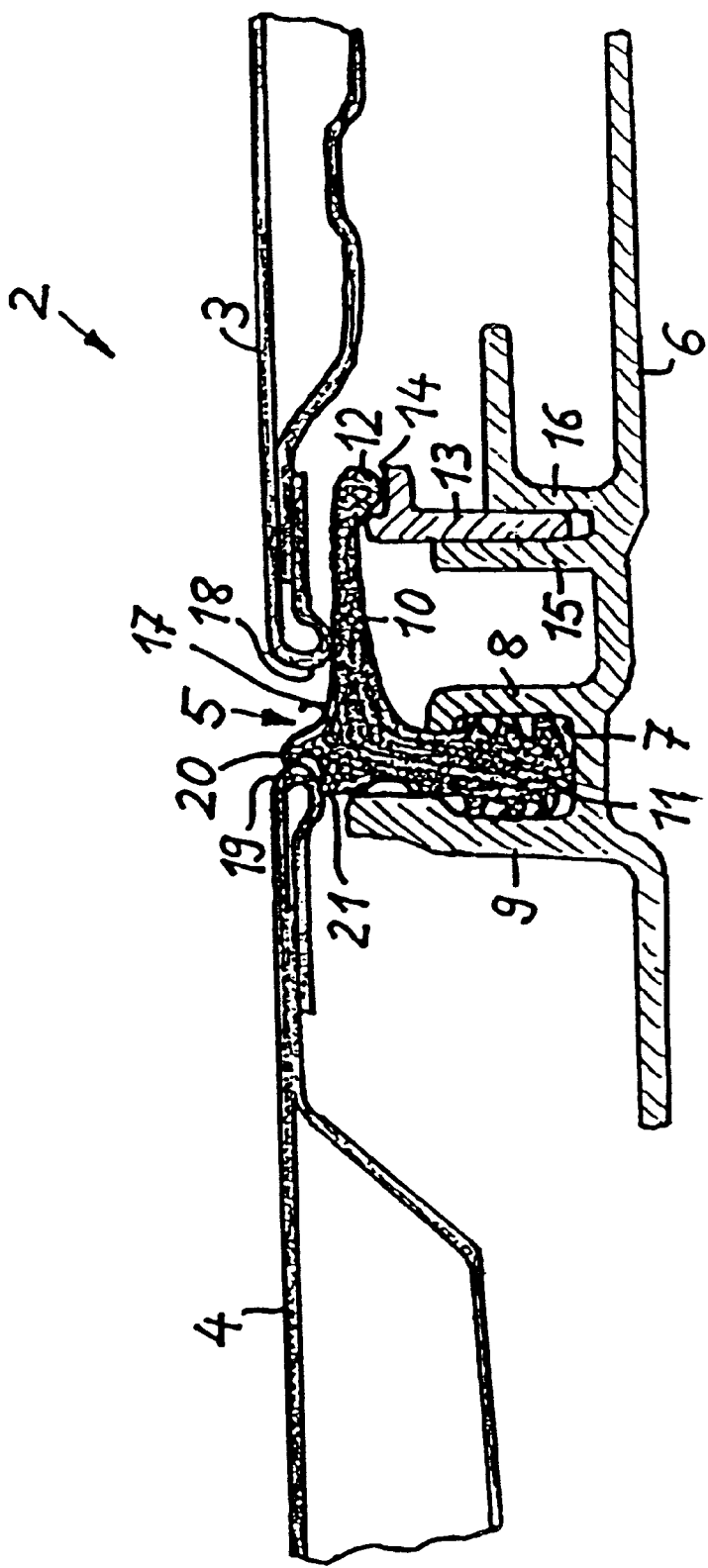
FIG. 2 is a sectional view along line II—II of FIG. 1 showing a roof frame fixed to the chassis and a movable roof element.

As can be seen in the section view of FIG. 2, a sealing element 5 is arranged between the roof frame 4 and the movable roof element 3 of the vehicle roof 2. The sealing element 5 is held in a receiving chamber 7 of a guide track 6 fastened to the vehicle. The guide tract 6 has correction tracts (not shown) for the movement of roof element 3. The receiving chamber 7 has two lateral walls 8, 9 which border an upper insert opening of the receiving chamber 7. The lateral wall 8 is shorter or lower in height than the opposite lateral wall 9 in order to create space for a laterally projecting sealing arm 10 of the sealing element 5. The higher projecting lateral wall 9 ensures the support of the sealing element in the closed position of the roof element 3.

The sealing arm 10 extends in transverse direction to the opening and closing direction of the roof element 3. The sealing arm 10 branches off from an upper section of a sealing body 11, the lower section of which is inserted into the receiving chamber 7, and has ribs to improve the resistance in receiving chamber 7. The planes of the sealing body 11 and of the sealing arm 10 are situated at approximately right angles to each other, and the sealing body 11 and the sealing arm 10 are of approximately equal length. The upper side of the sealing arm 10 forms a sealing surface 17 which rests so as to form a seal on the edge 18 of the roof element 3.

The sealing arm 10 has a cross-sectional geometry which tapers in the direction toward its free end. Changed in the area of the face of the sealing arm 10, is an expanded sealing band 12, which rests on a bearing shoulder 14 of a support 13, and is configured to be retained on the guide track 6. The bearing shoulder 14 is configured as one piece with the support 13.

The support 13 is retained in the space between two support walls 15, 16 which are provided on the guide track 6. The support 13 is arranged so as to be vertically movable in the space but in such manner that it can be fixed, whereby the sealing pressure of the edge 18 against the sealing surface 17 of the sealing element 3 can be influenced through adjustment of the height of the support 13. The sealing surface 17 runs approximately horizontally. Positions deviating from the horizontal can, however, also be realized through an appropriate height setting of the support 13. The edge 18 of the roof element 3 advantageously rests on the sealing surface 17 in the free-hanging area of the seal arm 10 to facilitate an optimally elastic behavior of the seal arm 10. The plane of the support 13 runs in the direction of movement of roof element 3. The fixing of the height of the support 13 can advantageously take place through suitable conventional fastening elements.

A sealing lip 20 and a sealing edge 21 are formed in the area of frame edge 19 of roof frame 4 in the outer transition area between sealing body 11 and sealing arm 10. The sealing lip 20 and a sealing edge 21 have an interposed sealing groove in which the frame edge 19 engages. The sealing lip 20 limits the frame edge 19 from above, while the sealing edge 21 limits it below the sealing groove. The sealing lip 20, sealing edge 21 and the interposed sealing groove guarantee a windtight and watertight union between the sealing element 3 and the roof frame 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Sealing element for a vehicle roof with a roof opening in which a movable roof element is arranged so as to be adjustable between an open position and a closed position, the sealing element in the closed position of the roof element being arranged with an edge of the roof element to engage a sealing surface facing toward an upper side of the roof so as to form a seal, wherein the sealing element comprises a sealing arm projecting transversely to an opening direction of the roof, the upper side of the sealing arm forming the sealing surface and the sealing arm being arranged to rest on a support in the vehicle roof;

wherein the support is configured to be vertically adjustable.

2. Sealing element for a vehicle roof with a roof opening in which a movable roof element is arranged so as to be adjustable between an open position and a closed position, the sealing element in the closed position of the roof element being arranged with an edge of the roof element to engage a sealing surface facing toward an upper side of the roof so as to form a seal, wherein the sealing element comprises a sealing arm projecting transversely to an opening direction of the roof, the upper side of the sealing arm forming the sealing surface and the sealing arm being arranged to rest on a support in the vehicle roof;

wherein the support is retained on a guide track, fixed to the vehicle body.

3. Sealing element according to claim 2, wherein the support is retained between two support walls of the guide track to provide vertical adjustability.

4. Sealing element according to claim 1, wherein a sealing band is provided at the free face of the sealing arm which rests on the support.

5. Sealing element according to claim 1, wherein the support includes a bearing shoulder for the sealing arm.

6. Sealing element according to claim 1, wherein the sealing element has a sealing body from which the sealing arm branches off laterally.

7. Sealing element according to claim 6, wherein center planes of sealing body and of the sealing arm in unloaded condition of the sealing element enclose an angle of approximately 90°.

8. Sealing element according to claim 6, wherein the sealing body and the sealing arm are of approximately equal length.

9. Sealing element for a vehicle roof with a roof opening in which a movable roof element is arranged so as to be adjustable between an open position and a closed position, the sealing element in the closed position of the roof element being arranged with an edge of the roof element to engage a sealing surface facing toward an upper side of the roof so as to form a seal, wherein the sealing element comprises a sealing arm projecting transversely to an opening direction of the roof, the upper side of the sealing arm forming the sealing surface and the sealing arm being arranged to rest on a support in the vehicle roof;

wherein a sealing lip is provided on the sealing element adjacent to the sealing surface to engage with a frame edge of a roof frame bordering the roof opening.

10. Sealing element according to claim 9, wherein the sealing element is provided with a sealing edge arranged adjacent the sealing lip to face the frame edge and the sealing element is further provided with a sealing grove between the sealing edge and the sealing lip to receive the frame edge.

* * * * *